United States Patent
Taylor et al.

(10) Patent No.: US 9,883,249 B2
(45) Date of Patent: Jan. 30, 2018

(54) BROADCASTER TOOLS FOR INTERACTIVE SHOPPING INTERFACES

(71) Applicant: Amazon Technologies, Inc., Seattle, WA (US)

(72) Inventors: Amber Autrey Taylor, Seattle, WA (US); Jon Darren Fleming, Redmond, WA (US); John Devlin Lynch, Alhambra, CA (US); Daniel Thomas Mellott, Seattle, WA (US); Brent Robert Mills, Seattle, WA (US); Liza Marie Walsh, Seattle, WA (US); Gary Alexander Campbell, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/751,831

(22) Filed: Jun. 26, 2015

(65) Prior Publication Data

US 2016/0381427 A1 Dec. 29, 2016

(51) Int. Cl.
*H04H 60/33* (2008.01)
*H04N 21/478* (2011.01)
(Continued)

(52) U.S. Cl.
CPC ....... *H04N 21/47815* (2013.01); *G06Q 30/00* (2013.01); *H04N 7/17318* (2013.01);
(Continued)

(58) Field of Classification Search
CPC ......... H04N 21/47815; H04N 21/2187; H04N 21/23424; H04N 21/242; H04N 21/252; H04N 21/25883; H04N 21/26258; H04N 21/4312; H04N 21/44222; H04N 21/472; H04N 21/4788; H04N 21/4826; H04N 21/812; H04N 7/17318
See application file for complete search history.

(56) References Cited

U.S. PATENT DOCUMENTS 6,421,706 B1 * 7/2002 McNeill ................. G06Q 10/10
709/204
6,754,904 B1 * 6/2004 Cooper .................. G06Q 10/10
348/E7.071
(Continued)

OTHER PUBLICATIONS

U.S. Patent Application entitled "Live Video Stream with Interactive Shopping Interface," filed Jun. 26, 2015 under U.S. Appl. No. 14/751,810.
(Continued)

*Primary Examiner* — An Son P Huynh
(74) *Attorney, Agent, or Firm* — Thomas | Horstemeyer, LLP

(57) ABSTRACT

Disclosed are various embodiments of broadcaster tools configured to manage interactive shopping interfaces presented in connection with a live video stream. A sequence of items scheduled to be featured within a live video stream is obtained. A user interface that facilitates editing the sequence of items is rendered. An edit to the sequence of items is received via the user interface. Item information transmitted to clients consuming the live video stream is modified based at least in part on the edit.

20 Claims, 8 Drawing Sheets

(51) Int. Cl.
*G06Q 30/00* (2012.01)
*H04N 7/173* (2011.01)
*H04N 21/2187* (2011.01)
*H04N 21/234* (2011.01)
*H04N 21/242* (2011.01)
*H04N 21/25* (2011.01)
*H04N 21/258* (2011.01)
*H04N 21/262* (2011.01)
*H04N 21/431* (2011.01)
*H04N 21/442* (2011.01)
*H04N 21/472* (2011.01)
*H04N 21/4788* (2011.01)
*H04N 21/482* (2011.01)
*H04N 21/81* (2011.01)

(52) U.S. Cl.
CPC ... H04N 21/2187 (2013.01); H04N 21/23424 (2013.01); H04N 21/242 (2013.01); H04N 21/252 (2013.01); H04N 21/25883 (2013.01); H04N 21/26258 (2013.01); H04N 21/4312 (2013.01); H04N 21/44222 (2013.01); H04N 21/472 (2013.01); H04N 21/4788 (2013.01); H04N 21/4826 (2013.01); H04N 21/812 (2013.01)

(56) References Cited

U.S. PATENT DOCUMENTS

| | | | |
|---|---|---|---|
| 7,143,428 B1* | 11/2006 | Bruck | H04N 5/44543 348/E5.105 |
| 7,603,683 B2* | 10/2009 | Reto | H04L 29/06027 709/204 |
| 7,962,935 B2* | 6/2011 | Kurosaki | H04H 20/76 725/39 |
| 8,013,938 B2* | 9/2011 | Shyu | H04N 7/147 348/14.04 |
| 8,307,395 B2* | 11/2012 | Issa | G06F 17/30817 709/219 |
| 8,312,500 B2* | 11/2012 | Emerson | H04L 12/581 725/110 |
| 8,327,395 B2* | 12/2012 | Lee | G06Q 30/02 725/10 |
| 8,661,464 B2* | 2/2014 | Arankalle | G06Q 30/02 705/14.41 |
| 8,745,661 B2* | 6/2014 | Ellis | 725/139 |
| 8,826,350 B1* | 9/2014 | Maeng | H04N 21/47202 715/753 |
| 8,898,316 B2* | 11/2014 | Facemire | H04N 7/15 386/241 |
| 8,918,330 B1* | 12/2014 | Winkler | G06Q 30/0254 705/14.16 |
| 8,935,713 B1* | 1/2015 | Gabel | H04H 60/65 705/14.53 |
| 9,055,312 B2* | 6/2015 | Civanlar | H04N 7/15 |
| 2001/0044751 A1 | 11/2001 | Pugliese et al. | |
| 2003/0028873 A1* | 2/2003 | Lemmons | H04N 7/17318 725/36 |
| 2003/0056219 A1* | 3/2003 | Reichardt | G06Q 30/0241 725/60 |
| 2004/0098754 A1* | 5/2004 | Vella | H04N 5/445 725/135 |
| 2005/0132420 A1* | 6/2005 | Howard | G06F 3/017 725/135 |
| 2005/0149987 A1* | 7/2005 | Boccon-Gibod | H04N 5/782 725/135 |
| 2005/0262542 A1* | 11/2005 | DeWeese | H04L 12/1818 725/106 |
| 2006/0130109 A1* | 6/2006 | Zenith | H04N 7/17318 725/110 |
| 2006/0179454 A1* | 8/2006 | Shusman | G06Q 30/02 725/45 |
| 2006/0184624 A1* | 8/2006 | Thukral | H04N 7/15 709/204 |
| 2006/0230123 A1 | 10/2006 | Simmons et al. | |
| 2007/0136753 A1* | 6/2007 | Bovenschulte | H04H 60/31 725/46 |
| 2007/0157106 A1* | 7/2007 | Bishop | H04L 67/36 715/771 |
| 2008/0066107 A1* | 3/2008 | Moonka | G06F 17/30796 725/42 |
| 2009/0063994 A1* | 3/2009 | Pickelsimer | G06F 17/30017 715/753 |
| 2009/0092374 A1* | 4/2009 | Kulas | H04N 7/173 386/248 |
| 2009/0113053 A1* | 4/2009 | Van Wie | H04L 12/1827 709/226 |
| 2009/0133078 A1* | 5/2009 | Hamano | H04N 5/76 725/87 |
| 2009/0222854 A1* | 9/2009 | Cansler | H04N 7/17318 725/35 |
| 2009/0233542 A1* | 9/2009 | Gratton et al. | H04H 60/80 455/3.06 |
| 2009/0235298 A1* | 9/2009 | Carlberg | H04N 5/44543 725/24 |
| 2009/0249223 A1* | 10/2009 | Barsook | H04N 7/15 715/753 |
| 2009/0328113 A1 | 12/2009 | Van De Klashorst | |
| 2009/0328122 A1* | 12/2009 | Amento | H04N 7/17318 725/114 |
| 2010/0017474 A1* | 1/2010 | Kandekar | H04N 7/17318 709/205 |
| 2010/0050222 A1 | 2/2010 | Legallais et al. | |
| 2010/0164989 A1 | 7/2010 | Margalit et al. | |
| 2011/0072452 A1* | 3/2011 | Shimy | H04N 7/163 725/25 |
| 2011/0078717 A1* | 3/2011 | Drummond | H04N 21/4586 725/14 |
| 2011/0099069 A1 | 4/2011 | Hoelz et al. | |
| 2011/0107215 A1* | 5/2011 | Klappert | G06F 3/167 715/716 |
| 2011/0126252 A1* | 5/2011 | Roberts | H04N 7/17318 725/114 |
| 2011/0126253 A1* | 5/2011 | Roberts | H04N 7/17327 725/114 |
| 2011/0194839 A1* | 8/2011 | Gebert | G11B 27/034 386/290 |
| 2011/0219098 A1 | 9/2011 | Xu et al. | |
| 2011/0264599 A1* | 10/2011 | Dalton | G06Q 30/02 705/347 |
| 2012/0110621 A1* | 5/2012 | Gossweiler, III | G06Q 50/01 725/46 |
| 2012/0232977 A1 | 9/2012 | Calman et al. | |
| 2013/0019261 A1 | 1/2013 | Huber et al. | |
| 2013/0031582 A1* | 1/2013 | Tinsman | H04N 21/2353 725/36 |
| 2013/0036442 A1* | 2/2013 | Wingert | H04N 21/42209 725/60 |
| 2013/0132515 A1 | 5/2013 | Mostafa et al. | |
| 2014/0081954 A1* | 3/2014 | Elizarov | H04N 21/252 707/722 |
| 2014/0118474 A1* | 5/2014 | Fluhr | H04L 65/403 348/14.09 |
| 2014/0244828 A1 | 8/2014 | Besehanic | |
| 2014/0282111 A1* | 9/2014 | Gurbag | H04L 65/403 715/756 |
| 2015/0026715 A1 | 1/2015 | Bernstein et al. | |
| 2016/0073055 A1* | 3/2016 | Marsh | H04N 7/152 348/14.08 |
| 2016/0308934 A1 | 10/2016 | Gholmieh et al. | |

OTHER PUBLICATIONS

U.S. Patent Application entitled "Synchronizing Interactive Content with a Live Video Stream," filed Jun. 26, 2015 under U.S. Appl. No. 14/751,816.

(56) References Cited

OTHER PUBLICATIONS

U.S. Patent Application entitled "Electronic Commerce Functionality in Video Overlays," filed Jun. 26, 2015 under U.S. Appl. NO. 14/751,823.
U.S. Patent Application entitled "Broadcaster Tools for Interactive Shopping Interfaces," filed Jun. 26, 2015 under U.S. Appl. No. 14/751,831.
U.S. Appl. No. 14/034,055 entitled "Playback of Content Using Multiple Devices" filed Sep. 23, 2013.
U.S. Appl. No. 14/751,810, filed Jun. 26, 2015, Office Action dated Aug. 23, 2016.
U.S. Appl. No. 14/751,810, filed Jun. 26, 2015, Restriction/Election dated May 17, 2016.
U.S. Appl. No. 14/751,816, filed Jun. 26, 2015, Restriction/Election dated Jul. 21, 2016.
U.S. Appl. No. 14/751,823, filed Jun. 26, 2015, Office Action dated Jun. 6, 2016.
PCT Patent Application PCT/US2016/039314 filed on Jun. 24, 2016, International Search Report and Written Opinion dated Sep. 15, 2016.
U.S. Appl. No. 14/751,823, filed Jun. 26, 2015, Final Office Action dated Oct. 31, 2016.
U.S. Appl. No. 14/751,823, filed Jun. 26, 2015, Non-Final Office Action dated Mar. 15, 2017.
U.S. Appl. No. 14/751,816, filed Jun. 26, 2015, Non-Final Office Action dated Feb. 3, 2017.
U.S. Appl. No. 14/751,810, filed Jun. 26, 2015, Advisory Action dated Mar. 7, 2017.
U.S. Appl. No. 14/751,810, filed Jun. 26, 2015, Final Office Action dated Jan. 19, 2017.
U.S. Appl. No. 14/751,810, filed Jun. 26, 2015, Response to Non-Final Office Action dated Aug. 23, 2016.
U.S. Appl. No. 14/751,810, filed Jun. 26, 2015, Response to Restriction/Election dated May 17, 2016.
U.S. Appl. No. 14/751,816, filed Jun. 26, 2015, Response to Restriction/Election dated Jul. 21, 2016.
U.S. Appl. No. 14/751,823, filed Jun. 26, 2015, Response to Final Office Action dated Oct. 31, 2016.
U.S. Appl. No. 14/751,823, filed Jun. 26, 2015, Response to Non-Final Office Action dated Jun. 6, 2016.

* cited by examiner

BROADCASTER TOOLS FOR INTERACTIVE SHOPPING INTERFACES

BACKGROUND

Historically, shopping is an activity that has involved a customer visiting a number of brick-and-mortar retail stores, browsing through inventory, selecting products of interest, and checking out to complete a purchase. Mail order companies introduced catalog-based shopping, whereby a customer peruses a printed catalog, views a catalog listing, and then places an order for a product via letter or telephone. The ordered product is delivered to the customer's premise a few days later. Although convenient, catalog-based shopping has inherent disadvantages, such as a lack of photo views of a product. High printing costs limited the number of photos of a product, particularly with respect to different angles or product variations.

During the early 1980s, home shopping channels on cable television were introduced. The home shopping channels offered television programming that described products for sale that could be ordered by phone. Viewers would regularly tune-in to see products that were displayed and talked about by live hosts. Enthusiastic personalities often developed a loyal following, and the shopping channels would give many hosts creative freedom in merchandising products.

Home shopping channels became less relevant with the introduction of Internet-based retailing in the late 1990s. Web sites offered photos and information about products without limit, greatly improving upon the previous analogue of printed catalogs. Product videos and animations could be provided, with 360 degree views of products. The online catalogs could be searched, and offerings of many competing retailers could be found instantly.

As compared with home shopping television channels, online retailers may lack the human component that motivates people to purchase. Sites such as YOUTUBE that offer user-created videos have become hugely popular with the "Millennial" generation. In fact, "how-to" videos have become an important driver of purchasing decisions among Millennials. For example, a person may create a video showing others how to use a particular product. During the video, the person may express opinions regarding the product. Viewers may then be motivated to purchase the product after viewing the video.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
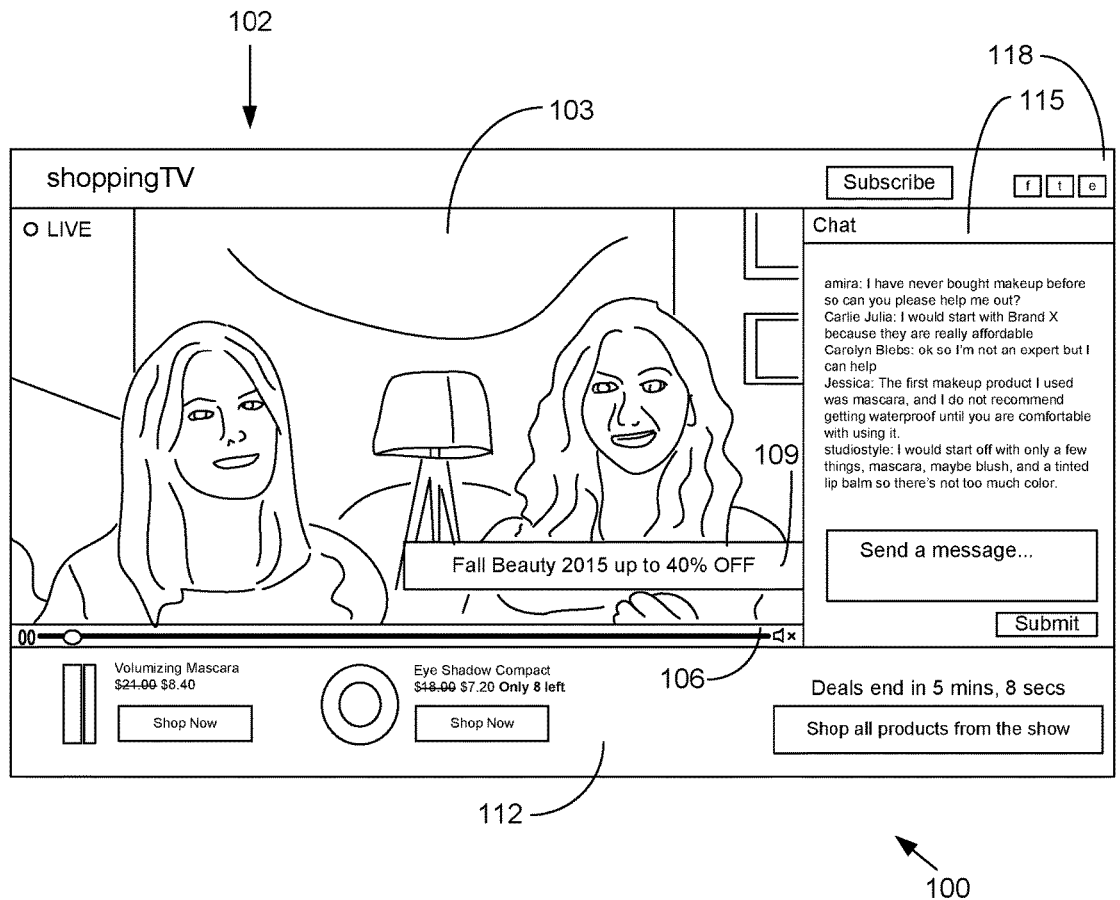
FIGS. 1A-1B are pictorial diagrams of example user interfaces rendered according to various embodiments of the present disclosure.

The present disclosure relates to broadcaster tools for managing an interactive shopping experience in conjunction with live video streams that discuss items offered for order. Traditional home shopping channels, despite having energetic personalities and loyal viewers, have not adapted well to the online arena. When a show host mentions a particular product, a viewer may then need to open a browser window or mobile application and search for the product. It may be difficult for the viewer to remember details of the product that would enable formulation of a good search query. Moreover, the search engine used by the viewer may provide relevant advertising that directs the viewer's attention away from the site of the home shopping channel. For example, the search engine may promote competing offers for the product.

Approaches may be used to market items in connection with prerecorded video shorts. For example, the Video Player Ad-Serving Interface Definition (VPAID) provides an application programming interface (API) for serving advertisements in conjunction with playback of digital video content. The Video Ad-Serving Template (VAST) is another technology that provides an advertisement response format that enables video advertisements to be served by compatible video players. VPAID and VAST are standards promulgated by the Interactive Advertising Bureau.

Various embodiments of the present disclosure introduce approaches for managing the serving of interactive content in conjunction with live video streams, such as live shopping programs that discuss items available for order or pre-order via an electronic commerce system or electronic marketplace. User interfaces are disclosed that facilitate presentation of orderable items alongside a live video stream. Some user interfaces may include a chat functionality for viewers to communicate with the program host and/or other viewers. Orderable items may be injected into the chat functionality as desired by the program host. In addition to orderable items, program hosts may inject other interactive actions into the user interfaces, such as viewer voting actions and others. Some user interfaces may incorporate overlays on top of the live video stream, where the overlays enable an interactive action. Furthermore, various embodiments are disclosed for synchronizing interactive content with the live video stream, with the understanding that the live video stream may be subject to some level of delay by the time at which it is rendered by a client device.

Various approaches relevant to interactive shopping interfaces are described in U.S. Patent Application entitled "LIVE VIDEO STREAM WITH INTERACTIVE SHOPPING INTERFACE," filed on Jun. 26, 2015 under Ser. No. 14/751,810, U.S. Patent Application entitled "SYNCHRONIZING INTERACTIVE CONTENT WITH A LIVE VIDEO STREAM," filed on Jun. 26, 2015 under Ser. No. 14/751,816, and U.S. Patent Application entitled "ELECTRONIC COMMERCE FUNCTIONALITY IN VIDEO OVERLAYS," filed on Jun. 26, 2015 under Ser. No. 14/751,823, which are incorporated herein by reference in their entirety.

Referring now to FIG. 1A, shown is a pictorial diagram of an example user interface 100 rendered according to various embodiments of the present disclosure. The user interface 100 corresponds to an interactive shopping interface, including a player interface 102 that is rendering a live video stream 103. The live video stream shows one or more hosts discussing a sequence of items that are featured within the program. The items are offered for ordering via an associated electronic commerce system. The player interface 102 may include various player controls 106 that may allow a viewer to jump to an earlier point in the live video stream, pause the live video stream, stop the live video stream, adjust the volume of the live video stream, and so on. One or more graphical overlays 109 may be superimposed over a portion of the frame of the live video stream, where a selection of a graphical overlay 109 may cause an interactive action relative to one or more items to be performed.

The user interface 100 may also include a shopping interface 112. The shopping interface 112 may be rendered as a panel (as shown in FIG. 1A) or may be rendered as an overlay on top of a portion of the live video stream. Alternatively, the shopping interface 112 may be rendered upon another display or in another window. The shopping interface 112 includes information about items currently being discussed within a segment of the live video stream. This information may include an item image, an item title, an item price, a quantity remaining indication, and/or other information.

For each item, a selectable item component may be provided (e.g., a button, link, item image, or infographic) such that when the selectable item component is selected, an interactive action relative to the item is performed. Such an interactive action may include adding the item to a shopping cart, initiating an order or purchase of the item, viewing an item detail page with more information about the item, casting a vote in respect to the item, saving the item for future reference, causing another image or video of the item to be rendered, or other actions. Where multiple versions of the item are offered, the interactive action may be with respect to a preselected one of the versions. In some cases, a user may select a version in the item detail page. Additionally, the shopping interface 112 may include a time limit for current offers, a selectable component to show all items discussed in the live video stream, and so on.

As the live video stream progresses, the content of the shopping interface 112 may be updated. A live video stream according to some approaches may be divided into segments, and the shopping interface 112 may include items featured or discussed in a current segment. In one embodiment, the shopping interface 112 may comprise a "shoveler" component configured to display information regarding only a subset of the items within a viewport. However, the user may scroll or otherwise manipulate the viewport to see information regarding previously discussed items, or items that may be discussed in the future. In some cases, this viewport may update automatically to show different items as they are featured in the live video stream.

The user interface 100 may also include a chat interface 115 configured to facilitate interactive communication among viewers of the live video stream and hosts and producers of the live video stream. Messages sent through the chat interface 115 may be propagated to all other users. The messages may be subject to moderation by a producer. In one embodiment, the host or producer may cause item information to be pushed into the chat interface 115, where selection of a component of the item information may result in adding the item to a shopping cart, initiating an order or purchase of the item, viewing an item detail page with more information about the item, casting a vote in respect to the item, or other actions.

Further, social network integrations 118 may be provided to promote the currently featured item(s) and/or the live video stream via social networks, email, and/or other forms of communication. For example, a user may share a currently discussed item or the live video stream via a social network. A subscribe function may allow a user to keep up with items discussed via the live video stream and/or future programs of the live video stream. For instance, upon selecting a subscribe component, a user may opt into emails announcing live video streams.

Many variations on the user interface 100 are contemplated herein, including more simplified user interfaces 100 for devices having smaller displays. For smaller display devices, it may be that only the live video stream 103 and the shopping interface 112 are rendered simultaneously on the screen.

Figure 1B:
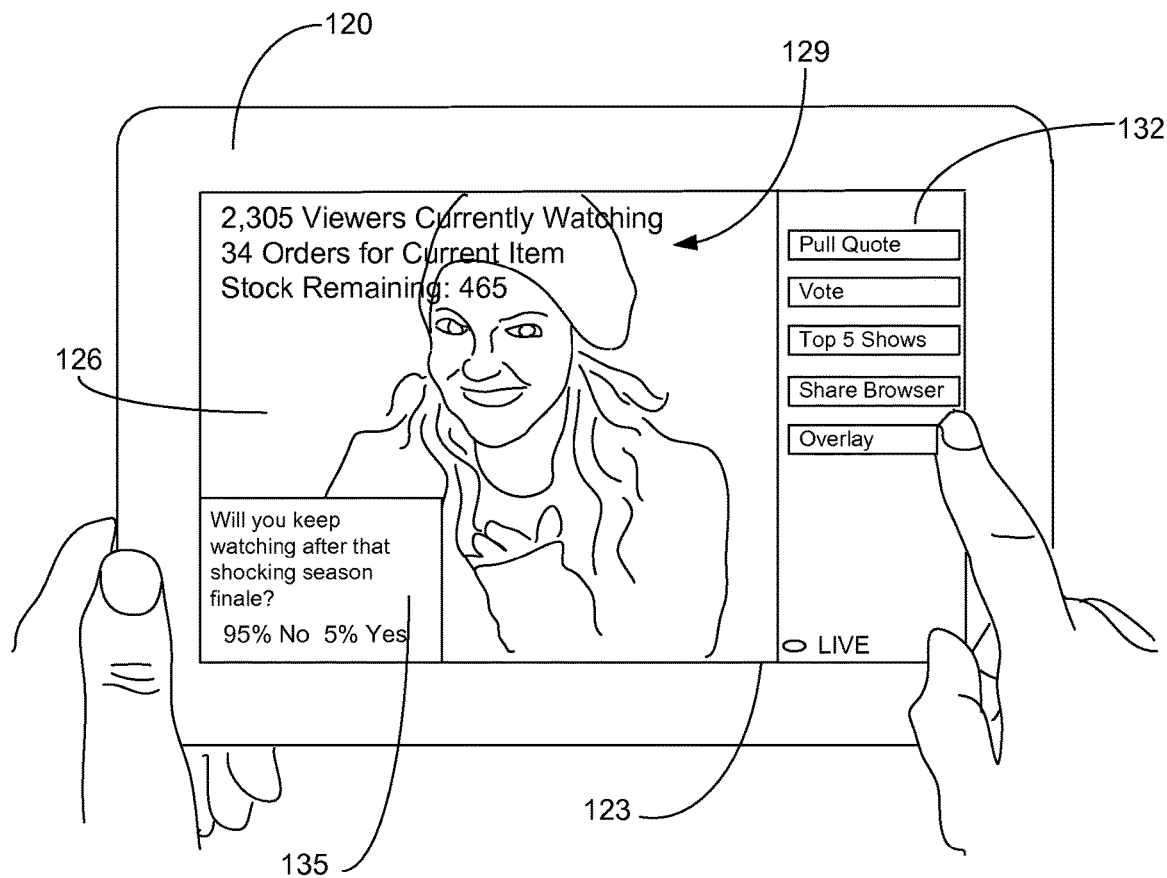

Turning now to FIG. 1B, shown is an example of a client device 120 rendering a broadcaster user interface 123 according to various embodiments of the present disclosure. The client device 120 may correspond to a tablet computer, a laptop, a smartphone, or other type of computing device. Prominently featured within the broadcaster user interface 123 may be the live video feed 126 that is being streamed to users. The live video feed 126 may correspond to a program that features items offered for order via an electronic commerce system, where the live video feed 126 is streamed for presentation in conjunction with an interactive shopping interface.

Various user statistics 129 may be shown to provide hosts and/or producers with real-time feedback on who is watching the live video stream. For example, the user statistics 129 may indicate how many users are streaming the live video feed 126, engagement statistics such as how many orders have been placed for a currently featured item or how many times the currently featured item has been added to a shopping list, how many units of the current item remain in stock, demographic information for the viewers, and/or other audience information. Some of the user statistics 129 may be generated based at least in part on user profile data associated with the electronic commerce system.

The broadcaster user interface 123 may include selectable components 132 that, when selected, are configured to perform various management actions with respect to the live video stream and the interactive shopping interfaces. For instance, the actions may include starting or stopping the live video feed, editing the items being presented in the interactive shopping interface, injecting item information into chat interfaces, offering a promotional price for an item, asking the users to participate in a vote or poll, causing a selectable graphical overlay to be rendered over the live video feed 126 (e.g., an overlay that when selected causes an item to be purchased, added to a shopping cart, etc., or any custom overlay), sharing a view of a host's web browser, accepting a video chat invitation, moderating communication between users, and so on.

One or more components 132 may allow the broadcaster to switch to control different live video streams. For example, a component 132 labeled "Top 5 Shows" may give a producer the ability to view or switch to any of the top five (or another number) of the most popular live video streams that are being broadcast. Popularity may be assessed by number of viewers (i.e., client devices to which the live video stream is being sent). A pull quote component 132 may allow a host or producer to select a particular communication sent by a viewer to be distributed among all viewers via the interactive shopping interface. For example, the communication may be taken from a social network feed (e.g., associated with a certain hashtag corresponding to the show) or from a text communication interface. Polling information 135 may be displayed to present the results of a poll or vote among users in real-time, based upon responses submitted by users via the interactive shopping interface. In the following discussion, a general description of the system and its components is provided, followed by a discussion of the operation of the same.

Figure 2:
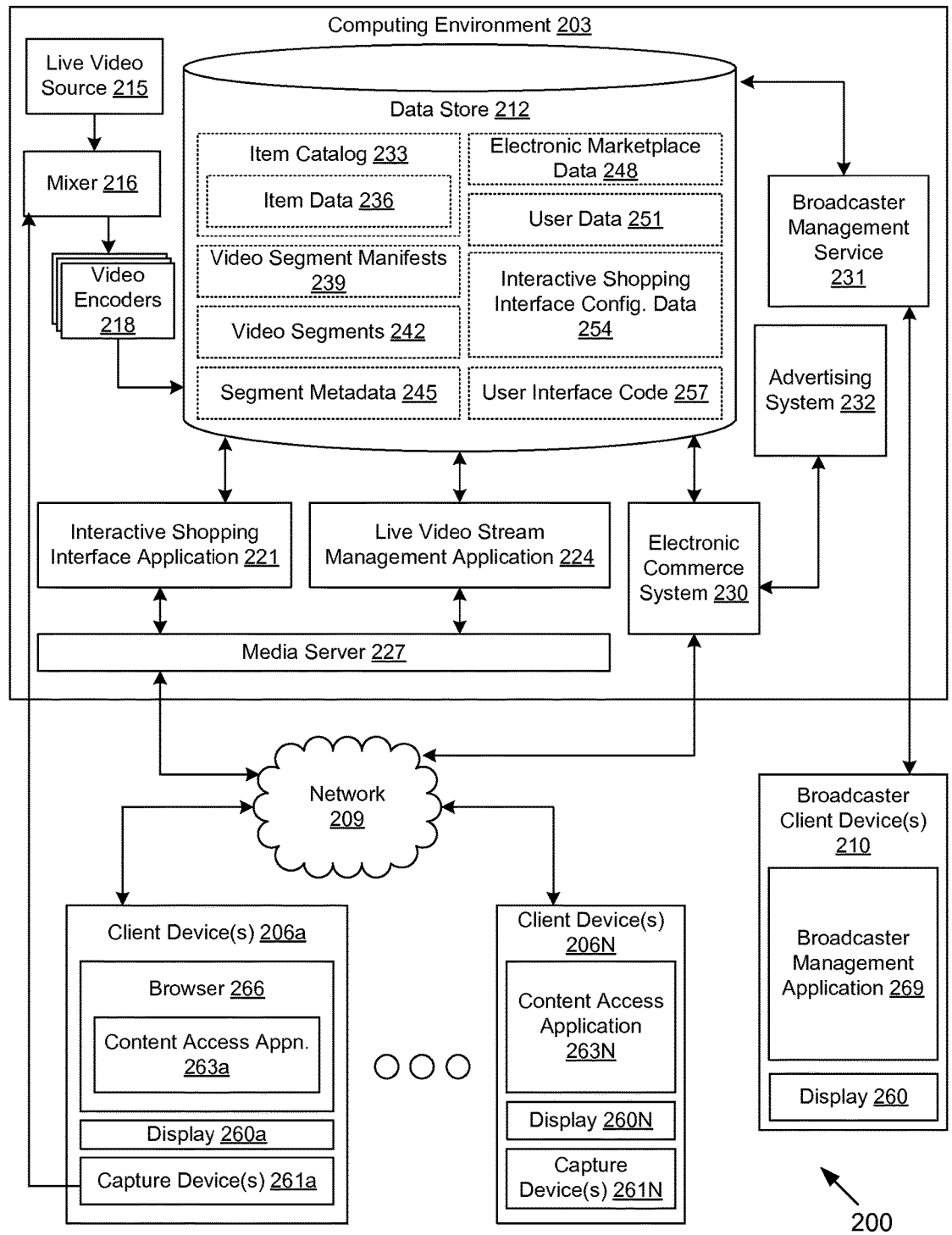
FIG. 2 is a schematic block diagram of a networked environment according to various embodiments of the present disclosure.

With reference to FIG. 2, shown is a networked environment 200 according to various embodiments. The networked environment 200 includes a computing environment 203 and a plurality of client devices 206a . . . 206N, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks. One or more broadcaster client devices 210 may be in communication with components of the computing environment 203 via the network 209 or an internal network.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed in the computing environment 203, for example, include a live video source 215, a video mixer 216, a plurality of video encoders 218, an interactive shopping interface application 221, a live video stream management application 224, a media server 227, an electronic commerce system 230, a broadcaster management service 231, an advertising system 232, and other applications, services, processes, systems, engines, or functionality not discussed in detail herein.

The live video source 215 obtains live video feed from a video mixer and/or one or more cameras. The live video feed may be in an uncompressed or compressed format. The live video source 215 supplies the live video feed to a video mixer 216, which then provides a video feed to a plurality of video encoders 218. The video mixer 216 may combine the output of the live video source 215 with one or more live video feeds originating in client devices 206. For example, the video mixer 216 may combine a video feed of a program host with a video feed of a customer.

The video encoders 218 compress the live video feed using one or more codecs (e.g., Moving Pictures Experts Group (MPEG)-2, MPEG-4, High Efficiency Video Coding (HEVC), and/or other formats) in order to reduce the bitrate of the live video feed for multiple quality levels. The video encoders 218 may generate multiple versions of a live video stream (e.g., 8K, 4K, 1024p, 480i, etc.) that can be received by client devices 206 having differing available network bandwidths. The video encoders 218 may encode the live video feed into chunks or segments. These segments may be of a fixed length (e.g., ten seconds). In some cases, the video encoders 218 may produce multiple different views of the live video stream 103, such as a view of a customer being interviewed and a view of the host doing the interview.

The interactive shopping interface application 221 is executed to generate an interactive shopping interface to accompany a live video stream. To this ends, the interactive shopping interface application 221 may determine items featured in the live video stream and then generate various metadata to be sent to the client devices 206. The metadata instructs the client devices 206 to render user interface components that facilitate an interactive shopping experience. The interactive shopping interface application 221 may also be configured to provide chat functionality that enables communication among multiple viewers of the live video stream.

The live video stream management application 224 is executed to control the presentation of the live video stream to the client devices 206. To this end, the live video stream management application 224 may generate manifests that point the client devices 206 to specific segment versions for the live video stream. The media server 227 is configured to send video data and interface data created by the interactive shopping interface application 221 and the live video stream management application 224 to the client devices 206. For example, the media server 227 may comprise a commercially available hypertext transfer protocol (HTTP) server. The media server 227 may serve data via HTTP, real-time transfer protocol (RTP), real-time streaming protocol (RTSP), or other protocols.

The electronic commerce system 230 is executed in order to facilitate the online order of items over the network 209 through an electronic marketplace in which one or more sellers participate. The electronic marketplace may be operated by a proprietor who may also be a seller. The electronic commerce system 230 also performs various backend functions associated with the online presence of a seller in order to facilitate the online order of items. For example, the electronic commerce system 230 may generate network content such as web pages, mobile application data, or other forms of content that are provided to client devices 206 for the purposes of selecting items for purchase, rental, download, lease, or other forms of consumption.

The broadcaster management service 231 is configured to facilitate management of the interactive shopping interface application 221, the live video stream management application 224, and the media server 227 by broadcaster users, such as hosts or producers of the live video stream 103. The broadcaster management service 231 is configured to gather a variety of audience statistics in regard to the client devices 206 that are consuming the live video stream 103. The audience statistics may be determined based at least in part on user profile data of the corresponding users for the electronic commerce system 230.

The advertising system 232 may link to the electronic commerce system 230 to provide advertising to be included within item detail pages, search result pages, category pages, and/or other content served by the electronic commerce system 230. The advertising system 232 in some embodiments may also provide advertising to be injected into the live video stream 103 or the shopping interface 112.

The data stored in the data store 212 includes, for example, an item catalog 233 storing item data 236, video segment manifests 239, video segments 242, segment metadata 245, electronic marketplace data 248, user data 251, interactive shopping interface configuration data 254, user interface code 257, and potentially other data. The item catalog 233 includes data regarding items offered for order through the electronic commerce system 230. Such items may include products, goods, services, digital content, and/or other items. The item data 236 may include titles, descriptions, weights, prices, quantities available, export restrictions, customer reviews, customer ratings, images, videos, version information, availability information, shipping information, and/or other data.

The video segments 242 correspond to segments of the live video stream that are served to client devices 206. Multiple versions of each segment may be encoded using different bitrates or codecs. The segment metadata 245 corresponds to a sequence of items featured during a video segment 242 or discussed by one or more hosts during the video segment 242. In some cases, the video segment 242 may be different from a "shopping segment" used to group items in interactive shopping interfaces. In particular, a "shopping segment" may correspond to multiple video segments 242. A producer or host may generate the segment metadata 245 in advance or in real-time while the live video stream is created. The video segment manifests 239 may include locator information (e.g., uniform resource locators (URLs)) indicating where specific versions of video segments 242 may be obtained. In one embodiment, the video segment manifests 239 may be used to implement the HTTP Live Streaming (HLS) protocol. Further, the video segment manifests 239 may encode the segment metadata 245 associated with the particular video segment 242.

The electronic marketplace data 248 includes data relating to offers of items for order or preorder via an electronic marketplace implemented by the electronic commerce system 230. The user data 251 may include personal profile information of a user such as account information, order history, browse history via the electronic commerce system 230, items seen via the interactive shopping interface, video segments 242 viewed, chat history, and/or other data.

The interactive shopping interface configuration data 254 configures the operation of the interactive shopping interface application 221. For instance, the interactive shopping interface configuration data 254 may include layout parameters, available options, and so on, to control the appearance of the interactive shopping interface. The user interface code 257 is used to implement the interactive shopping interface. To this end, the user interface code 257 may include code executable on the client device 206. The user interface code 257 may include hypertext markup language (HTML) data, JavaScript data, dynamic HTML (DHTML) data, video player code, and other data.

The client devices 206 and the broadcaster client devices 210 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client devices 206 and the broadcaster client devices 210 may include a respective display 260. The displays 260 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc. The client devices 206 may also include one or more capture devices 261a . . . 261N such as image cameras, video cameras, microphones, three-dimensional video capture devices, and other capture devices.

The client devices 206 may be configured to execute various applications such as a content access application 263a . . . 263N and/or other applications. The content access application 263 may be executed in a client device 206, for example, to access network content served up by the computing environment 203 and/or other servers, thereby rendering a user interface 100 (FIG. 1A) on the display 260. To this end, the content access application 263 may comprise a dedicated application as with client device 206N, or the content access application 263 may be executed in a browser 266, as is the case with client device 206a.

The broadcaster client device 210 is configured to execute a broadcaster management application 269 among other applications. The broadcaster management application 269 is configured to communicate with the broadcaster management service 231 to effect monitoring and management functions of the components of the computing environment 203 involved in producing the live video stream 103 and in updating the interactive shopping interfaces. The broadcaster management application 269 may be a standalone application or a web-based application. The client devices 206 and the broadcaster client devices 210 may be configured to execute applications beyond the content access application 263, the browser 266, and the broadcaster management application 269 such as, for example, email applications, social networking applications, word processors, spreadsheets, and/or other applications.

Next, a general description of the operation of the various components of the networked environment 200 is provided. To begin, a user launches a content access application 263 and accesses a uniform resource locator (URL) associated with a live video stream with an interactive shopping interface. Various user interface code 257 may be sent to the client device 206 for client-side execution. A live video stream 103 (FIG. 1A) begins playing via a player interface of the content access application 263. The live video stream 103 depicts one or more hosts discussing a sequence of items.

In advance or during the production of the live video stream 103, the hosts or producers of the live video stream 103 may create a sequence of items corresponding to the items to be discussed or featured via the broadcaster management application 269. As the live video stream 103 progresses, the hosts or producers may select via a user interface which items are being discussed. The interactive shopping interface application 221 is thereby able to determine which items are discussed or featured at any given time. The hosts or producers may also manage the live video stream 103 via the live video stream management application 224.

While the live video stream 103 is being streamed to the client device 206 by the media server 227, information indicating the featured or discussed items is also sent to the client device 206 by the media server 227, either through a push or pull arrangement. The content access application 263 is configured to render an interactive shopping interface that presents information about the currently featured items. The interactive shopping interface may include selectable item components, corresponding to the items, that perform an interactive function or action, such as adding the item to a shopping list or cart via the electronic commerce system 230, initiating an order of an item via the electronic commerce system 230, causing an item detail page to be rendered, casting a vote in regard to an item, and so on. The content access application 263 is configured to maintain synchronization of the items shown in the interactive shopping interface with respect to the progress of the live video stream 103.

In addition, an item history or timeline user interface may show previously discussed items or items to be discussed in the future. The items in the timeline user interface may be grouped by video segment 242. A chat interface may enable communication among viewers of the live video stream 103 and potentially show hosts or producers. A host or producer, via the broadcaster management application 269, may cause selectable graphical overlays to be rendered over the live video stream 103. Selection of the selectable graphical overlays may cause an interactive function to be performed. Hosts or producers may also cause item information to be pushed to the client devices 206 within chat interfaces. Hosts or producers may also update other metadata such as time remaining, items ordered, pricing, viewer polls, and so on. Several examples of user interfaces will next be discussed.

Figure 3A:
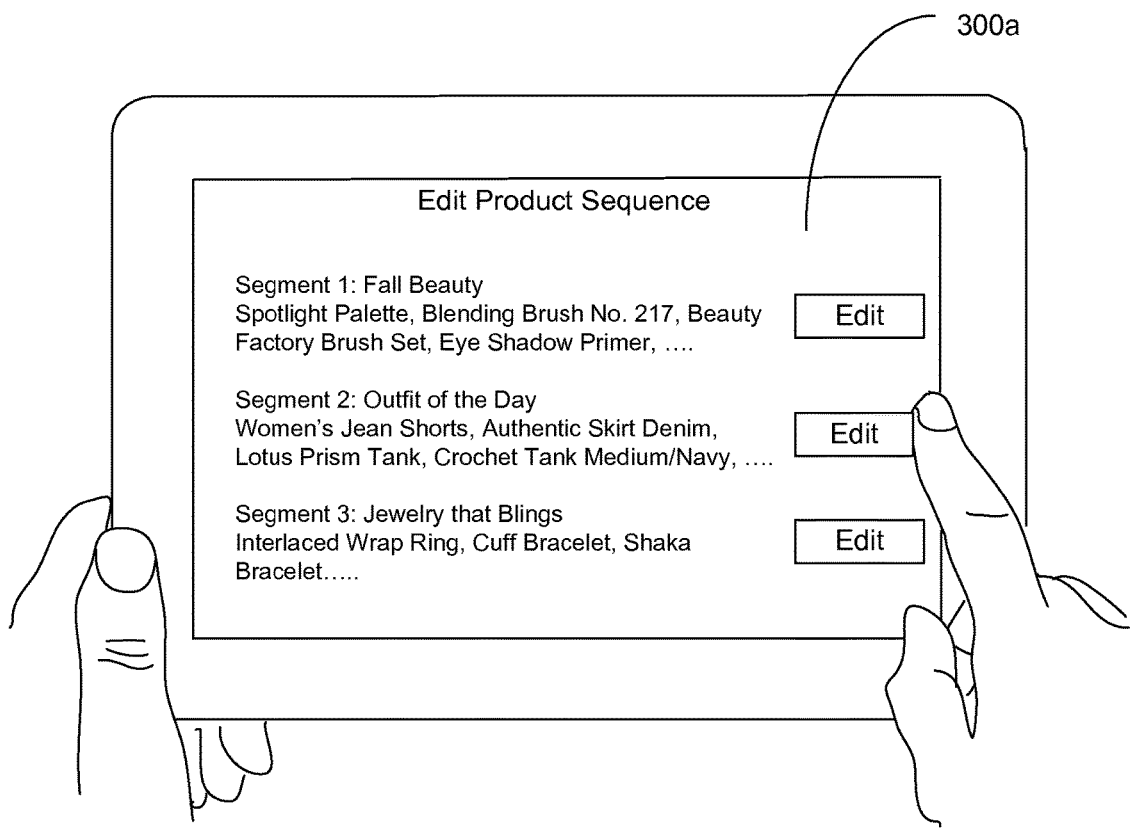
FIGS. 3A-3B are pictorial diagrams of example user interfaces rendered by a broadcaster client device in the networked environment of FIG. 2 according to various embodiments of the present disclosure.

Referring next to FIG. 3A, shown is a pictorial diagram of an example user interface 300a rendered according to various embodiments of the present disclosure. The user interface 300a corresponds to an item sequence editor rendered by the broadcaster management application 269 (FIG. 2). The user interface 300a may be configured to allow a host or producer user to create a sequence of items to be featured, delete items from the sequence, add items to the sequence, reorder items in the sequence, associate promotional prices or offers with items in the sequence, and perform other functions. The various items in the sequence may be grouped by scheduled show segments. The items may be associated with scheduled start times and expiration times, which may be modified via the user interface 300a.

The user interface 300a may also facilitate creation of a promotional offer regarding an item. The host or producer may establish a discounted price for the item if certain criteria are met. For example, the host or producer may offer a 25% off discount for ordering a certain bracelet if at least 200 users place an order during the show segment in the live video stream 103 (FIG. 1A).

Figure 3B:
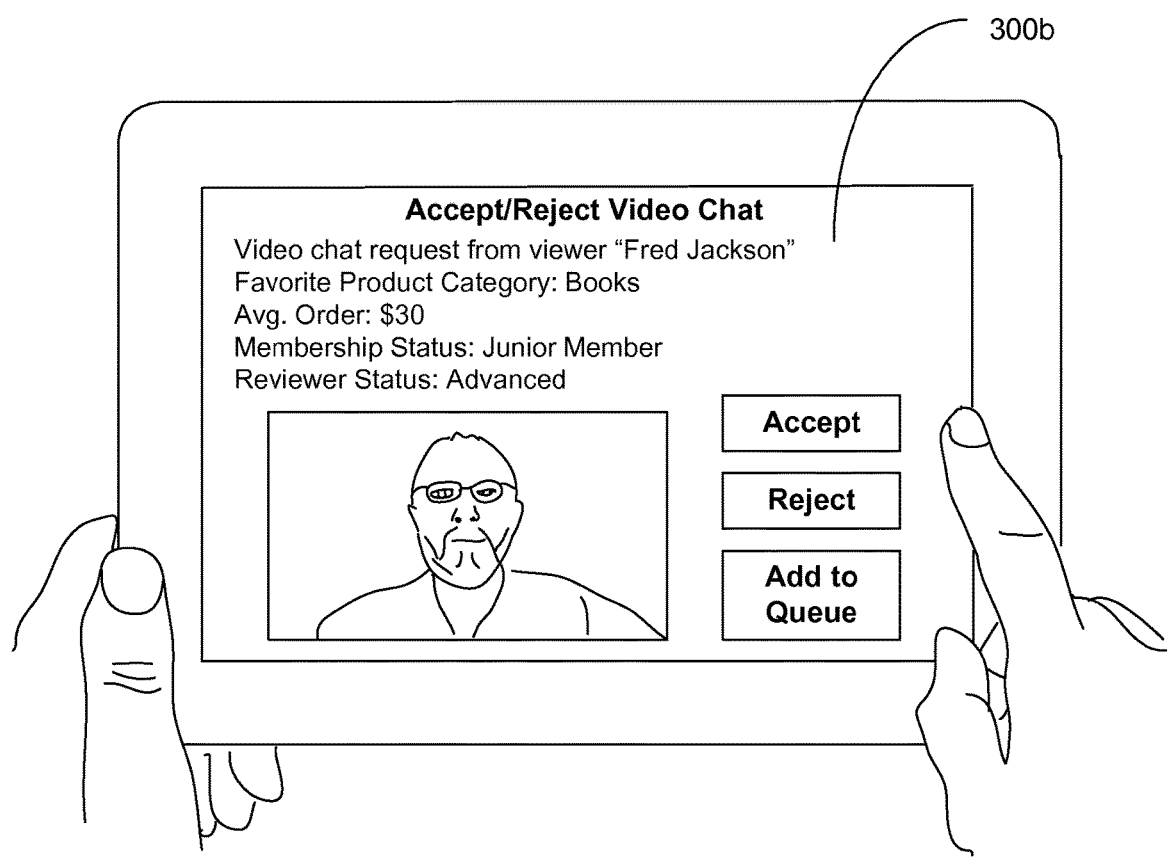

Turning now to FIG. 3B, shown is a pictorial diagram of an example user interface 300b rendered according to various embodiments of the present disclosure. The user interface 300b corresponds to a communication moderator rendered by the broadcaster management application 269 (FIG. 2). Specifically, in this example, the user interface 300b presents a video chat request from a user.

The user interface 300b may present various information about the user, such as demographic information or other information determined with reference to the user data 251 (FIG. 2) that is associated with the electronic commerce system 230 (FIG. 2). As non-limiting examples, this information may include a user's name, age, purchasing habits (e.g., average order total, favorite item categories, etc.), date of last purchase, item review history such as number of reviews, classification of the user with respect to reviews (e.g., expert, advanced, occasional, etc.), subscription status of the user with respect to a periodic membership or subscription, whether the user is a verified customer, links to social networking accounts of the user, whether the user is qualified to use emoticons or other features in chat interfaces, communication history via the chat panel of the interactive shopping interface, and so on.

The user interface 300b may enable the host or producer to accept the request, reject the request, put the request on hold in a queue, communicate directly with the user, and/or perform other functions. When a host or producer adds the request to a queue, the host or producer may specify a location in the queue (e.g., position 2 of 12). Bidirectional screening interview functionality may be provided in some embodiments. To this end, the host or producer may be able to communicate via a text, voice, and/or video bidirectional communication channel with the potential guest, which may be helpful to screen guests and/or provide instructions to prepare them for an interview. For example, the host or producer may instruct a guest to adjust their webcam or to sit differently in front of the camera. The communication channel may differ from the live video stream in that it may be directed to the potential guest only and not to other viewers.

When the request is accepted, the video and/or audio of the user is obtained from the client device 206 and mixed with the video from the live video source 215 to produce the live video stream 103. In addition to moderating video chat requests, the user interface 300b may facilitate moderating text or voice chat among the users at the client devices 206. Specific messages may be screened and released or deleted. Also, certain users may be blocked from sending messages.

Figure 4A:
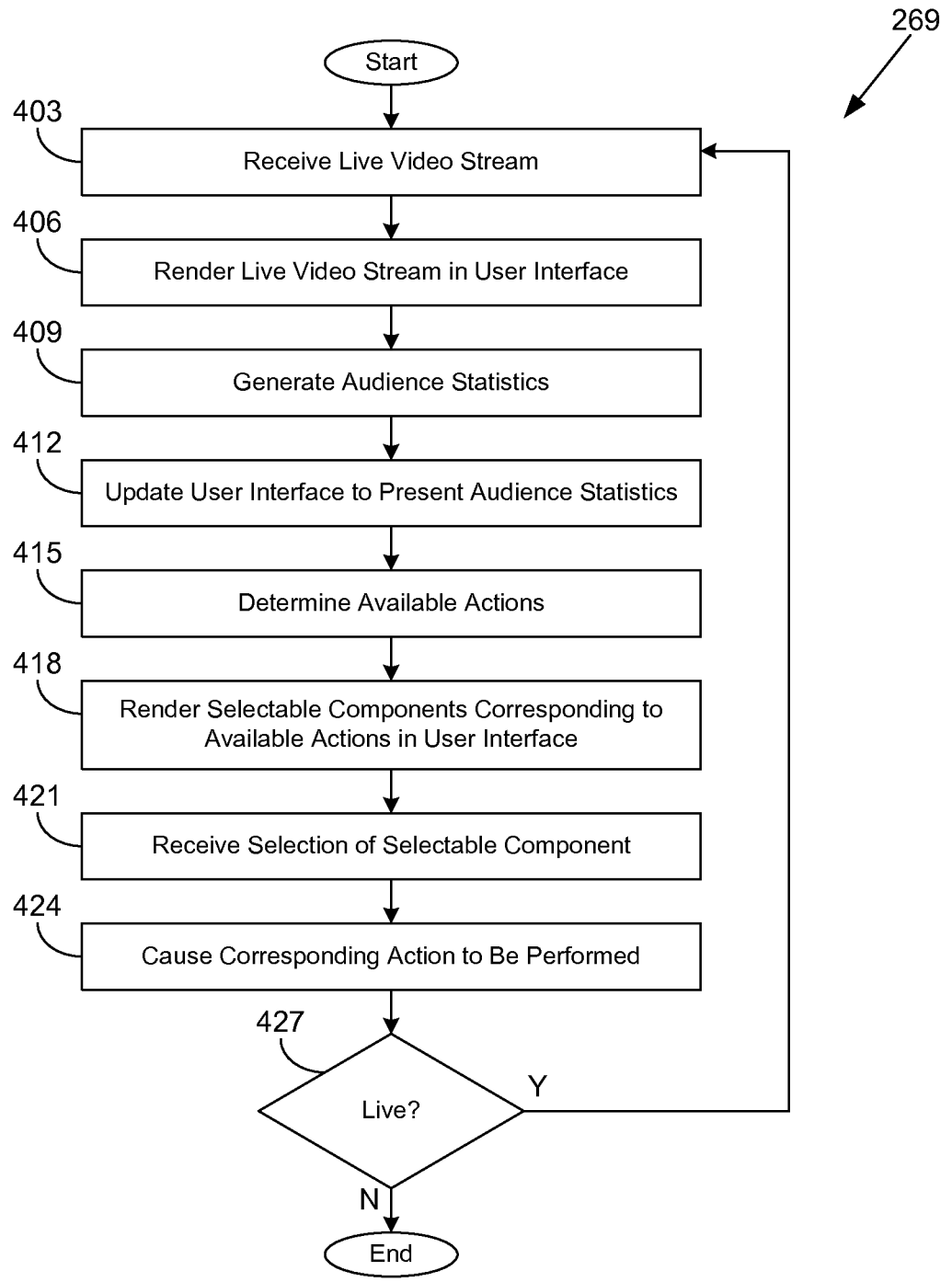
FIGS. 4A-4B are flowcharts illustrating examples of functionality implemented as portions of a broadcaster management application executed in a broadcaster client device in the networked environment of FIG. 2 according to various embodiments of the present disclosure.

Referring next to FIG. 4A, shown is a flowchart that provides one example of the operation of a portion of the broadcaster management application 269 according to various embodiments. Portions of the flowchart of FIG. 4A may be performed by the broadcaster management service 231 (FIG. 2) in communication with the broadcaster management application 269 in some embodiments. It is understood that the flowchart of FIG. 4A provides merely an example of the many different types of functional arrangements that may be employed to implement the operation of the portion of the broadcaster management application 269 as described herein. As an alternative, the flowchart of FIG. 4A may be viewed as depicting an example of elements of a method implemented in the broadcaster client device 210 according to one or more embodiments.

Beginning with box 403, the broadcaster management application 269 receives a live video stream 103 (FIG. 1A). In box 406, the broadcaster management application 269 renders the live video stream 103 in a user interface. In box 409, the broadcaster management application 269 generates one or more audience statistics pertaining to a plurality of users associated with a plurality of client devices 206 (FIG. 2) that are currently consuming the live video stream 103. In box 412, the broadcaster management application 269 updates the user interface to present the audience statistics. Other statistics pertaining to inventory stock remaining, sales velocity, and so on, may also be presented. The statistics may be updated on the user interface in real-time in response to determining that one or more of the client devices 206 has performed an interactive function with respect to an item. Such interactive functions may include initiating an order of an item, adding the item to a shopping cart, viewing an item detail page, and others.

In box 415, the broadcaster management application 269 determines available actions that can be performed by a host or producer user. In box 418, the broadcaster management application 269 renders one or more selectable components (e.g., buttons, links, etc.) in the user interface that correspond to the available actions. In box 421, the broadcaster management application 269 receives a selection of a selectable component. For example, the host or producer user may indicate that an item is currently featured in the live video stream 103, the user may inject item information into a chat interface rendered by the client devices 206, the user may cause a selectable graphical overlay to be presented relative to the live video stream 103 via the client devices 206, and so on.

In box 424, the broadcaster management application 269 causes the corresponding action to be performed. Through this action, in some scenarios, item information being transmitted to the client devices 206 for presentation via an interactive shopping interface may be modified. For example, editing the sequence of items may cause the "shoveler" interface rendered by the client devices 206 to show the edited sequence of items. In one scenario, the action may cause a poll to be staged among the client devices 206, and data encoding a poll item may be sent to the client devices 206. Accordingly, polling results may be received from the client devices 206, and information about the polling results may be updated upon the user interface.

In another scenario, the host or producer user may provide a promotional price for an item, and the broadcaster management application 269 may configure the electronic commerce system 230 (FIG. 2) to honor the promotional price for the client devices 206 that are consuming the live video stream 103, potentially while they are consuming the live video stream or at a future time.

In box 427, the broadcaster management application 269 determines whether the current programming is still live. If the current programming is still live, the broadcaster management application 269 returns to box 403 and continues receiving the live video stream 103. If the current programming is not live, the operation of the portion of the broadcaster management application 269 ends.

Figure 4B:
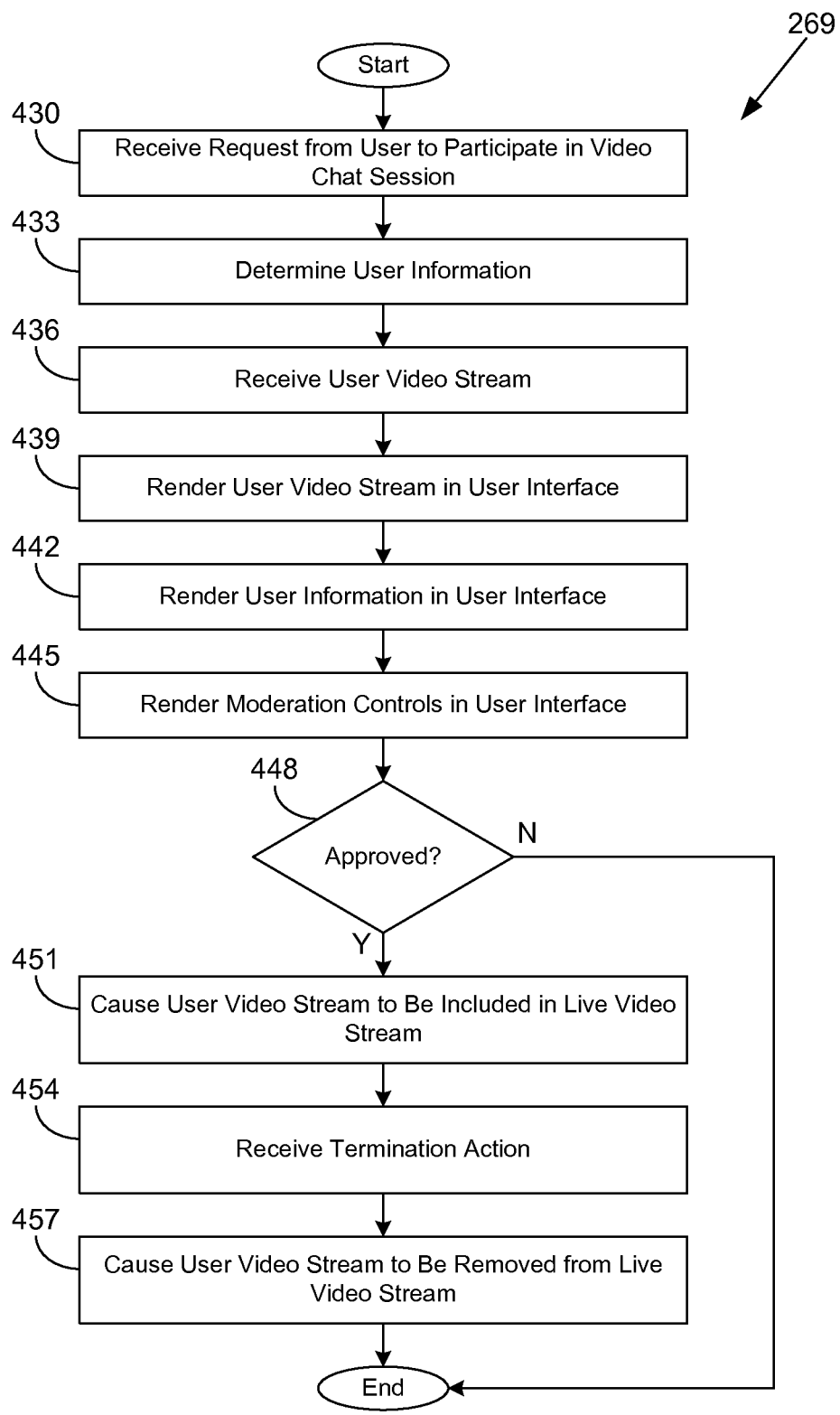

Turning now to FIG. 4B, shown is a flowchart that provides one example of the operation of a portion of the broadcaster management application 269 according to various embodiments. Portions of the flowchart of FIG. 4A may be performed by the broadcaster management service 231 (FIG. 2) in communication with the broadcaster management application 269 in some embodiments. It is understood that the flowchart of FIG. 4B provides merely an example of the many different types of functional arrangements that may be employed to implement the operation of the portion of the broadcaster management application 269 as described herein. As an alternative, the flowchart of FIG. 4B may be viewed as depicting an example of elements of a method implemented in the broadcaster client device 210 according to one or more embodiments.

Beginning with box 430, the broadcaster management application 269 receives a request from a user to participate in a video chat session. In box 433, the broadcaster management application 269 determines user information associated with the user. In box 436, the broadcaster management application 269 receives the user video stream originating from the client device 206 (FIG. 2) of the user. In box 439, the broadcaster management application 269 renders the user video stream in the user interface. In box 442, the broadcaster management application 269 renders the user information in the user interface.

In box 445, the broadcaster management application 269 renders moderation controls in the user interface. For example, the moderation controls may include an approval component, a rejection component, a hold component, and so on. The moderation controls may include functionality to perform a screening interview with the potential guest. In box 448, the broadcaster management application 269 determines whether the host or producer user has approved the user video chat request. If the request is not approved, the operation of the portion of the broadcaster management application 269 ends. If the request is approved, the broadcaster management application 269 continues to box 451.

In box 451, the broadcaster management application 269 causes the user video stream to be included within the live video stream 103. In box 454, the broadcaster management application 269 receives a termination action. For instance, the user may have ended the transmission of the user video stream, or the host or producer user may have selected a selectable termination component. In box 457, the broadcaster management application 269 causes the user video stream to be removed from the live video stream 103. Thereafter, the operation of the portion of the broadcaster management application 269 ends.

Figure 5:
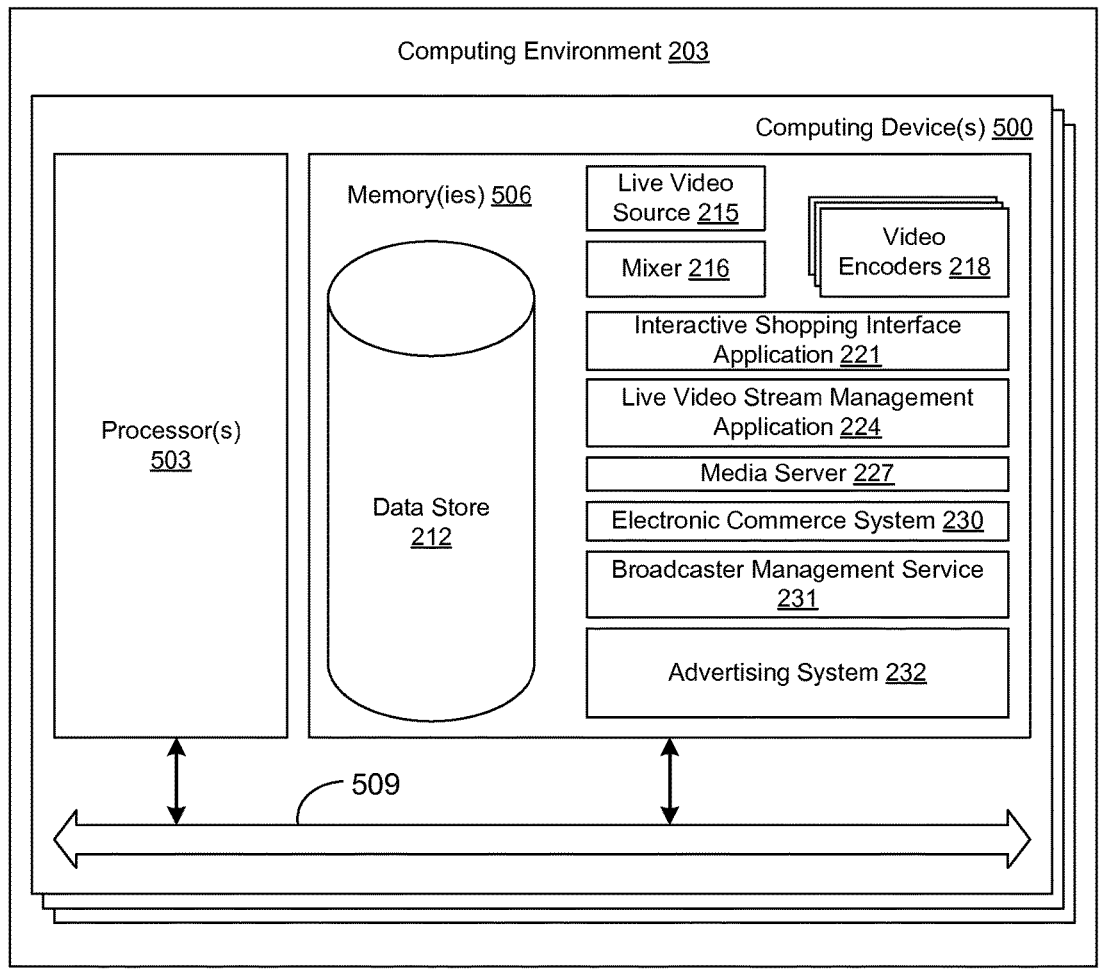
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the live video source 215, the video mixer 216, the plurality of video encoders 218, the interactive shopping interface application 221, the live video stream management application 224, the media server 227, the electronic commerce system 230, the broadcaster management service 231, the advertising system 232, and potentially other applications. Also stored in the memory 506 may be a data store 212 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the live video source 215, the video mixer 216, the plurality of video encoders 218, the interactive shopping interface application 221, the live video stream management application 224, the media server 227, the electronic commerce system 230, the broadcaster management service 231, the advertising system 232, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4A-4B show the functionality and operation of an implementation of portions of the broadcaster management service 231 and/or the broadcaster management application 269 (FIG. 2). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 4A-4B show a specific order of execution, it is understood that the order of execution may differ from that which is depicted. For example, the order of execution of two or more blocks may be scrambled relative to the order shown. Also, two or more blocks shown in succession in FIGS. 4-7 may be executed concurrently or with partial concurrence. Further, in some embodiments, one or more of the blocks shown in FIGS. 4A-4B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the live video source 215, the video mixer 216, the plurality of video encoders 218, the interactive shopping interface application 221, the live video stream management application 224, the media server 227, the broadcaster management service 231, the electronic commerce system 230, and the advertising system 232, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the live video source 215, the video mixer 216, the plurality of video encoders 218, the interactive shopping interface application 221, the live video stream management application 224, the media server 227, the broadcaster management service 231, the advertising system 232, and the electronic commerce system 230, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500 or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium having a plurality of computer instructions executable in at least one computing device, wherein, when executed, the plurality of computer instructions cause the at least one computing device to:
   capture a first live video stream;
   send the first live video stream to a plurality of clients;
   receive an indication from a producer user via a user interface that a product is featured in the first live video stream, the producer user being a producer of the first live video stream;
   in response to receiving the indication, send product information to the plurality of clients, wherein the plurality of clients are thereby configured by the product information to render a selectable product component in an interactive shopping interface synchronized with the first live video stream, and a user selection of the selectable product component is configured to cause an interactive function to be performed with respect to the product;
   determine that a particular client of the plurality of clients has performed the interactive function;
   present, via the user interface, a request from the particular client to participate in a video chat session with the producer user, the user interface including a plurality of selectable action components and one or more user-specific statistics corresponding to a client user associated with the particular client, the plurality of selectable action components comprising at least one of an approve component, a disapprove component, an add-to-queue component, or a communicate component, and the one or more user-specific statistics comprising at least one of: one or more purchasing habits, a date of last purchase, an item review history, a user review classification status, a subscription status, one or more social networking accounts, or a communication history of at least one prior chat session;
   initiate, via the user interface, a video communication between the client user associated with the particular client and the producer user in response to a first producer selection of the communicate component, the video communication being through a channel separate from the first live video stream, and the video communication comprising a screening interview between the client user and the producer user;
   receive, via the user interface, an approval of the request from the producer user in response to a second producer selection of the approve component;
   in response to receiving the approval, cause a second live video stream originating from the particular client to be shown to the plurality of clients within the first live video stream by mixing the second live video stream with the first live video stream via a video mixer; and
   update at least one user statistic shown by the user interface in response to determining that the particular client has performed the interactive function.

2. The non-transitory computer-readable medium of claim 1, wherein the interactive function corresponds to initiating an order of the product, adding the product to a shopping cart, or viewing a product detail page of the product.

3. The non-transitory computer-readable medium of claim 1, wherein the plurality of computer instructions further cause the at least one computing device to render a moderation user interface configured to moderate a communication system among the plurality of clients.

4. A system, comprising:
   at least one computing device; and
   a broadcaster management application executed in the at least one computing device, wherein the broadcaster management application causes the at least one computing device to at least:
   generate a plurality of audience statistics in regard to a plurality of users associated with a plurality of clients that are consuming a first live video stream, at least one of the plurality of audience statistics being generated based at least in part on user profile information of the plurality of users obtained from an electronic commerce system;
   generate a user interface configured to present the plurality of audience statistics and facilitate management of an interactive shopping interface rendered by the plurality of clients in association with the first live video stream;
   present, via the user interface, a request from a particular client device of the plurality of clients that is associated with a particular user of the plurality of users to participate in a video chat session with a host user, the user interface including a plurality of action components and one or more user-specific audience statistics corresponding to the particular user, the plurality of action components comprising at least one of an approve component, a disapprove component, an add-to-queue component, or a communicate component, and the one or more user-specific audience statistics comprising at least one of: one or more purchasing habits, a date of last purchase, an item review history, a user review classification status, a subscription status, one or more social networking accounts, or a communication history of at least one prior chat session;

facilitate, via the user interface, bidirectional video communication between the particular user and the host user in response to a first selection of the communicate component, the bidirectional video communication comprising a screening interview between the particular user and the host user;

receive, via the user interface, an approval of the request from the host user in response to a second selection of the approve component; and cause a second live video stream originating from the particular client device to be shown to the plurality of users within the first live video stream in response to receiving the approval of the request by mixing the second live video stream with the first live video stream via a video mixer.

5. The system of claim 4, wherein the plurality of audience statistics includes at least one of: a count of the plurality of clients, user demographic statistics, or user engagement statistics.

6. The system of claim 4, wherein the broadcaster management application further causes the at least one computing device to at least:
receive, via the user interface, a user selection of a particular item offered by the electronic commerce system; and
inject, in response to the user selection, a selectable item component corresponding to the particular item into a chat interface rendered by the plurality of clients.

7. The system of claim 4, wherein the broadcaster management application further causes the at least one computing device to at least:
determine at least one selection statistic corresponding to customer selections of individual ones of a plurality of items featured in the first live video stream; and
wherein the user interface is further configured to present the at least one selection statistic.

8. The system of claim 4, wherein the first live video stream is associated with a sequence of items slated to be featured in the first live video stream, wherein the user interface is further configured to facilitate editing of the sequence of items.

9. The system of claim 8, wherein the user interface is further configured to:
receive a user selection of a particular item from a catalog of items; and
add the particular item to the sequence of items.

10. The system of claim 8, wherein the user interface is further configured to:
receive a user selection of a particular item from the sequence of items; and
reorder the particular item within the sequence of items or remove the particular item from the sequence of items.

11. The system of claim 8, wherein the broadcaster management application further causes the at least one computing device to at least:
determine a subset of the sequence of items that are currently featured in the first live video stream; and
cause information about the subset of the sequence of items to be sent to the plurality of clients.

12. The system of claim 11, wherein the plurality of clients are configured to render an interactive shopping interface in association with the first live video stream, the interactive shopping interface including a plurality of selectable item components corresponding to the subset of the sequence of items.

13. The system of claim 4, wherein the broadcaster management application further causes the at least one computing device to at least present, via the user interface, individual user profile information associated with the particular user.

14. The system of claim 4, wherein the bidirectional video communication is within a communication channel that is separate from the first live video stream.

15. A method, comprising:
obtaining, by at least one computing device, a sequence of items scheduled to be featured within a first live video stream;
causing, by the at least one computing device, a user interface to be rendered, the user interface facilitating editing of the sequence of items;
receiving, by the at least one computing device, an edit to the sequence of items via the user interface;
modifying, by the at least one computing device, item information transmitted to a plurality of clients based at least in part on the edit, wherein individual clients of the plurality of clients are currently consuming the first live video stream and are is configured to render an interactive shopping interface based at least in part on the item information that is modified;
presenting, by the at least one computing device, a user interface containing a request from a particular client of the plurality of clients to participate in a video chat session with a host user, the particular client being associated with a consuming user interacting with the first live video stream, the user interface comprising a plurality of action components and one or more user-specific statistics corresponding to the consuming user associated with the particular client, the plurality of action components comprising at least one of an approve component, a disapprove component, an add-to-queue component, or a communicate component, and the one or more user-specific statistics comprising at least one of: one or more purchasing habits, a date of last purchase, an item review history, a user review classification status, a subscription status, one or more social networking accounts, or a communication history of at least one prior chat session;
facilitating, by the at least one computing device, bidirectional video communication between the host user of the user interface and the consuming user associated with the particular client in response to a first selection of the communicate component, the bidirectional video communication comprising a screening interview between the particular user and the host user;
receiving, by the at least one computing device, an approval of the request from the host user via the user interface in response to a second selection of the approve component; and
causing, by the at least one computing device, a second live video stream originating from the particular client to be shown within the first live video stream in response to receiving the approval of the request by mixing the second live video stream with the first live video stream via a video mixer.

16. The method of claim 15, further comprising:
receiving, by the at least one computing device, a request via the user interface to stage a poll among the plurality of clients;
sending, by the at least one computing device, data encoding a poll item to the plurality of clients;
receiving, by the at least one computing device, polling results from the plurality of clients; and causing, by the at least one computing device, information about the polling results to be rendered via the user interface in real-time.

17. The method of claim 15, further comprising:

receiving, by the at least one computing device, a promotional price for an item via the user interface; and configuring, by the at least one computing device, an electronic commerce system to honor the promotional price for the plurality of clients.

18. The method of claim 15, wherein the interactive shopping interface presents a plurality of selectable item components, corresponding to the sequence of items, in synchronization with the first live video stream accounting for a delay associated with the first live video stream being rendered by the plurality of clients.

19. The method of claim 15, further comprising:

receiving, by the at least one computing device, a request to create a selectable graphical overlay for the first live video stream;

generating, by the at least one computing device, data encoding the selectable graphical overlay; and sending, by the at least one computing device, the data encoding the selectable graphical overlay to the plurality of clients, wherein a selection of the selectable graphical overlay is configured to cause an interactive function to be performed with respect to a particular item.

20. The method of claim 15, further comprising:

receiving, by the at least one computing device, a user selection of a particular item offered by an electronic commerce system; and injecting, by the at least one computing device, in response to the user selection, a selectable item component corresponding to the particular item into a chat interface rendered by the plurality of clients.

* * * * *